INVENTORS
WILLIAM L. TENNEY
CHARLES B. MARKS

Patented Apr. 7, 1953

2,633,703

UNITED STATES PATENT OFFICE 2,633,703

MULTIPLE TAIL PIPE JET

William L. Tenney, Crystal Bay, Minn., and Charles B. Marks, Las Vegas, Nev.; said Marks assignor to said Tenney Application April 11, 1946, Serial No. 661,365

1 Claim. (Cl. 60—35.6)

This invention relates to high output cyclic jet thrust devices suitable for fabrication in any desired cross sectional shape, as well as ratio of length to cross section, and having a multiplicity of small cross sectional area, short, high cyclic frequency thrust or tail pipes. We have found that by the use of a relatively small diameter, short length tail pipe, it is possible to obtain very efficient operation and high thrust using a single pipe connected to one combustion chamber. It is entirely possible to multiply the total overall thrust by simply duplicating said units, but to do so requires a proportionate increase in the overall cross sectional area of the unit, as well as needless duplication of combustion chamber walls and other parts.

It is an object of the present invention to provide an improved construction wherein a plurality of relatively high cyclic frequency exhaust tubes are used with a single combustion chamber of any desired cross sectional area and utilizing any suitable valve plate such as that described in our copending application Ser. No. 661,367, filed April 11, 1946, entitled Valve Mechanism, now abandoned, or other suitable type of air inlet passage. It is also an object of the invention to provide an improved mechanism utilizing a plurality of jet tail pipes and a single combustion chamber capable of resisting the high temperatures involved and of providing cooling arrangements for the tail pipes. It is a further object of the invention to provide an improved multiple tail pipe unit utilizing a preformed polygonal configuration such that the tail pipes may be nested into a space-conserving arrangement and connected to a single combustion chamber.

Other and further objects of the invention are those inherent in the apparatus herein illustrated, described and claimed.

The invention is illustrated with reference to the drawings in which

Throughout the drawings corresponding numerals refer to the same parts.

Figure 1:
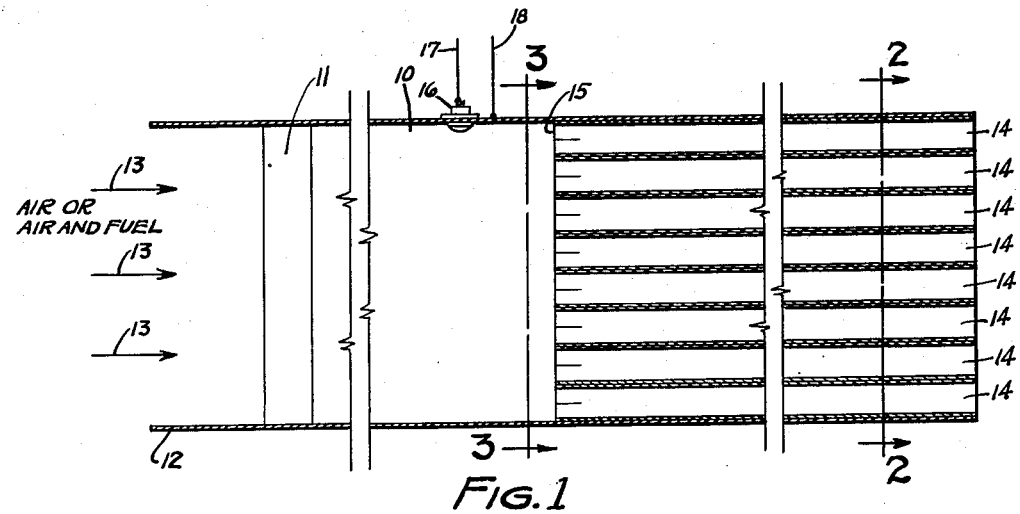
Figure 1 is a longitudinal sectional view through the air and fuel inlet section, valve section, combustion chamber and tail pipe arrangement of one form of the invention.
Figures 2, 3:
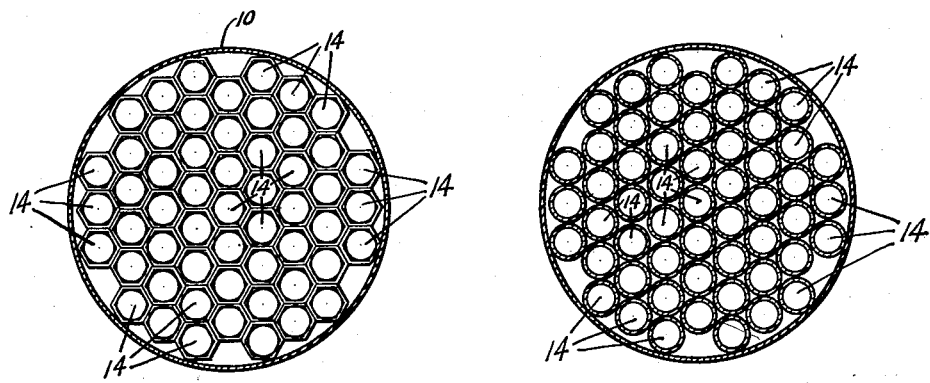
Figure 2 is a sectional view of the apparatus shown in Figure 1 taken in the direction of arrows 2—2 of Figure 1.
Figure 3 is a transverse sectional view of the same apparatus and taken in the direction of arrows 3—3 of Figure 1.

Referring to Figures 1, 2 and 3, the combustion chamber 10 is of any desired cross sectional shape which is here shown for illustrative purposes as being of circular configuration, although it is to be understood that it may be shaped to conform with the cross section of the fuselage or nacelle of an airplane or flying bomb, or with the trailing edge of a wing, the shape of an automobile body, etc. The combustion chamber is of desired length and is provided at its forward end with a valve mechanism generally designated 11 which, if the valve is used, may be as shown in our copending application Ser. No. 661,367 filed April 11, 1946, entitled Valve Mechanism, now abandoned. It is to be understood that the valve mechanism may be dispensed with and the air or air-fuel mixture introduced through an inlet such as that shown in our application Ser. No. 661,363 filed April 11, 1946, entitled Resonant Pulse Jet Devices with Restricted Flow Passage, or the air or air-fuel mixture may be introduced by a ramming effect as in ram jet mechanisms. The introduction of air and fuel is through inlet 12, the air or air-fuel mixture being introduced against the valve plate, as illustrated by arrows 13—13—13.

From the combustion chamber there extend a plurality of tail pipes 14 which are here illustrated as of circular configuration. They are stacked together so that there is no intervening space wasted between them, and at the transverse line 15—15 the tubes are shaped out into hexagonal form so that the peripheries of the tubes nest together, as shown in Figure 3. The nested edges are attached by any suitable manner as by spot welding through the side walls or by welding the adjacent edges together by flame or gas welding. The tubes thus present a minimum side wall edge area to the combustion chamber, as well as a minimum resistance to the gas flow, and hence do not pick up any more heat than is absolutely necessary, although, of course, they become intensely hot during operation During operation the air or fuel-air mixture is introduced through the valve plate 11, where used, or is otherwise introduced into the combustion chamber, where ignition is initiated by the sparking unit 16 to which an ignition wire 17 is temporarily attached for starting. The ground wire 18 is temporarily attached to the body of the jet mechanism. Once combustion is initiated it continues at a high cyclic rate when fuel and air in the correct proportions are supplied to the unit.

Figure 4:
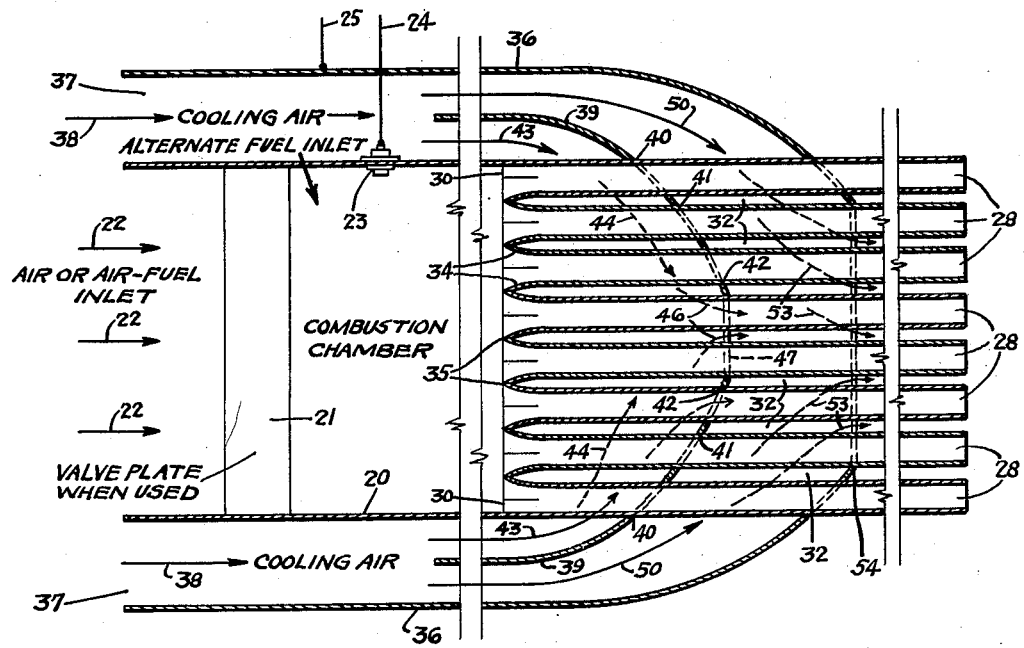
Figure 4 is a longitudinal sectional view of a second form of the invention.
Figure 5:
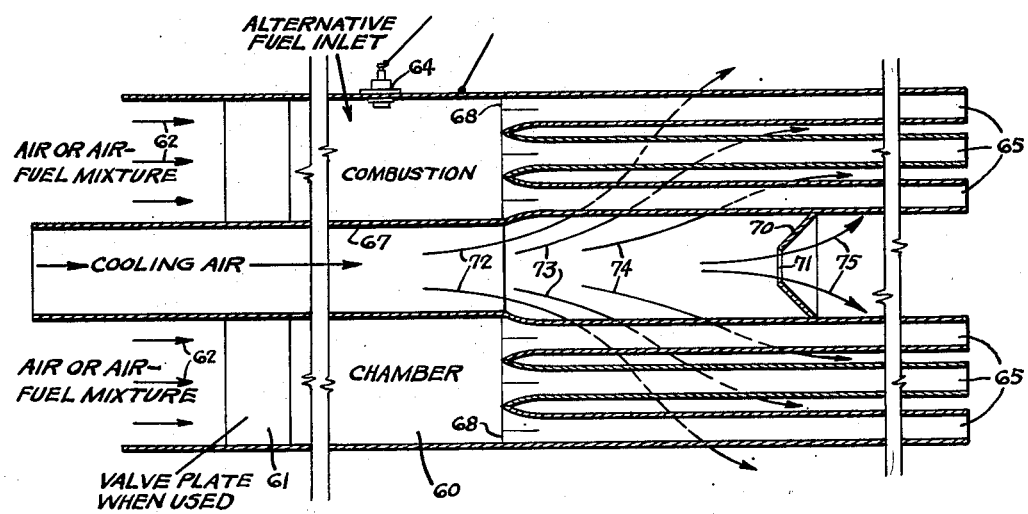
Figure 5 is a longitudinal sectional view of another form of the invention.

From an examination of Figures 1, 4 and 5 it becomes readily apparent that by use of the multiple tail pipes it is possible greatly to shorten the overall length of the cyclic jet propulsion unit as compared with single tail pipe arrangements of comparable outer diameter, hence making for a much more compact power plant.

In Figure 4 there is illustrated another form of the invention in which the combustion chamber 20 may likewise be of any suitable cross sectional shape or area as determined largely by the situation in which the propulsion unit is installed. One side of the combustion chamber is provided with a valve plate 21 which, as in the case of the device illustrated in Figure 1, may be a valve of any desired type such as that illustrated in our application Ser. No. 661,367 filed April 11, 1946, entitled Valve Mechanism, now abandoned, or the valve mechanism may be dispensed with and the air or air-fuel mixture introduced through an inlet such as that shown in our application Ser. No. 661,363 filed April 11, 1946 and entitled Resonant Pulse Jet Devices with Restricted Flow Passage, or the air or air-fuel mixture may be introduced by ramming effect as in the ram jet mechanism. Regardless of the type of inlet used at 21, the air or air-fuel mixture is introduced in the direction of arrows 22 into the combustion chamber 20 where combustion is initiated by the igniter 23 to which an ignition wire 24 is temporarily attached for starting purposes, the companion ignition wire 25 being temporarily attached to any convenient conductive surface of the unit. The tail pipes 28 are of convenient diameter and length suitable for the size of combustion chamber used and air inlet means, and are flared out at their inner ends located along the line 30—30 to a polygonal shape having a sufficient dimension such that when the flared out ends are nested together and fastened the tail pipes themselves will be maintained in spaced relationship, thus providing the spaces 32 between the tail pipes. If desired, an occasional stiffening web, not illustrated, may be inserted between adjacent tail pipes, but usually this is unnecessary and they are supported entirely by attachment together along the line 30—30 into a nested group. It is desirable that the tail pipe be shaped to a form so that from the polygonal shape at the line 30—30 each of the pipes is gradually reduced in cross sectional area along the smooth curve 34, for it has been found in use that any abrupt curvature results in hot spots. Likewise the fastened together edges illustrated at 35 are made as narrow as practical, such as by welding them together and finishing to a narrow edge so as to reduce the area exposed directly to the combustion chamber, as well as to provide as little resistance as possible to the gas flow.

In the device shown in Figure 4 there is provided a ductwork at 36 which has a conveniently located air inlet such as at 37 by which cooling air is picked up as the propulsion unit goes rapidly through the atmosphere. The cooling air is directed along the path of arrows 38 until it reaches the air duct baffle 39 which is a shroud shaped so as to direct a portion of the air as nearly as possible to the center tubes. To do this the shroud 39 is pierced at 40, 41 and 42 so as to permit the three outer tubes illustrated to pass through it. The air then inflowing along arrows 43 is guided across the portions of the outer tubes nearest the combustion chamber as indicated by arrows 44 and consequently cools these tubes. The air then traverses the inner tubes and passes up and around them along the path of arrows 46 and through the central opening 47 in the shroud 39 and axially along these tubes until exhausted at the jet nozzles.

Another portion of the air passes along the duct 36 in the direction of arrows 50 and thence passing over the outer banks of tubes leaves via arrows 53 through the large aperture 54 in the outer shroud 36, it being noted that the outer shroud 36 converges inward and is apertured to take the outer banks of tubes. In this manner cooling air is distributed over all the tubes and over most of the length of each tube. It is to be understood, of course, that the shape of the shrouds 39—39 and 36—36 is illustrative and may be varied so as to achieve desired air flow over the tubes and to provide adequate cooling air where the hottest areas are developed.

Referring to Figure 5 there is illustrated another form of the invention utilizing cooling air. In this instance the combustion chamber 60 is, as in the previously illustrated forms of the invention, provided with a valve plate 61, when used, or with inlet passageway or ram air of the types previously suggested. The air or air-fuel mixture enters via arrows 62 in the combustion chamber where combustion is initiated, as previously described, by means of the igniter 64, temporary connections to the igniter being provided as hereinbefore described. In the form of the invention illustrated in Figure 5 the tail pipes 65 are constructed as previously described with reference to the form of invention shown in Figure 4, except that a central cooling air duct 67 is carried through the valve plate 61 and combustion chamber and is fitted into the nest of tube ends along the plane 68—68, it being understood that the ends of tubes 65, terminating in the combustion chamber, are sealed to each other, to the peripheral walls of the combustion chamber and to the walls of the air conduit 67 so that the combustion chamber is effectively sealed except for the exit passageway through the tail pipes 65 and the inlet passageway through the valve plate or the air or air-fuel introduction mechanism 61. The cooling air passing through the ductwork 67 may be baffled, if desired, by an internal baffle 70 intermediate the length of the inner banks of tubes. The baffle 70 is apertured at 71 so as to allow some cooling air to pass therethrough for cooling the outer reaches of the inner banks of tubes. By regulating the size and position of the baffle 70 the cooling air is caused to move outwardly, as indicated by arrows 72, 73 and 74 and some of the air moves along the path of arrow 75, thereby producing a desired and useful distribution of cooling air so that the inner banks of tubes, which are normally the hottest, are first traversed by the cooling air. By this expedient the tube life is greatly extended, as compared with installations in which no cooling provisions are provided. It is to be understood, of course, that cooling may be dispensed with where the materials employed for construction are adapted to withstand the temperatures obtained during the expected useful life of the unit, which in many instances may never exceed a few minutes of operation, but where a longer life or less heat resistant materials are utilized, cooling air may be introduced and used to advantage.

As many apparently widely different embodiments of this invention may be made without departing from the spirit and scope thereof, it is to be understood that we do not limit ourselves to the specific embodiments herein except as defined by the appended claim.

What we claim is:

A resonant pulse jet engine comprising an open combustion chamber free of internal obstructions and having interior walls constructed for the rapid pulsating flow of gases therethrough, means for introducing fuel and air into said combustion chamber to form a combustible mixture, means for initiating combustion in said combustion chamber, means including valve mechanism operable automatically in direct response to the resonant pulsating action within said combustion chamber and located at one end of said combustion chamber for continuing the supply of said combustible mixture with resulting periodic combustion thereof, and a substantial number of unobstructed exhaust pipes each opening freely and directly into the same said combustion chamber at the opposite end thereof and forming part of the resonating system therewith, said exhaust pipes having walls forming individual passages of predetermined substantial length relative to the cross dimensions thereof to resonate as part of said system and having separate freely open ends for discharge of the gases as jets therethrough with resulting high thrust and relatively short overall length, the inlet ends of said exhaust pipes being expanded and terminating in narrow edges of reduced area offering reduced resistance to the flow of gas therethrough, the remainder of the length of said pipes being laterally spaced from each other forming air flow passages therebetween, and means for directing a flow of cooling air into said air flow passages for discharge rearwardly in the direction of the discharge from said exhaust pipes.

WILLIAM L. TENNEY.
CHARLES B. MARKS.

REFERENCES CITED

The following references are of record in the file of this patent:

UNITED STATES PATENTS

| Number | Name | Date |
|---|---|---|
| 1,980,266 | Goddard | Nov. 13, 1934 |
| 1,995,768 | Fesenmaier | Mar. 26, 1935 |
| 2,395,919 | Sundell | Mar. 5, 1946 |
| 2,427,846 | Forsyth | Sept. 23, 1947 |
| 2,480,540 | Bodine | Aug. 30, 1949 |
| 2,523,379 | Kollsman | Sept. 26, 1950 |
| 2,525,782 | Dunbar | Oct. 17, 1950 |
| 2,573,697 | Dunbar et al. | Nov. 6, 1951 |